July 3, 1928.
F. S. CARR
1,675,787
FASTENER
Original Filed Feb. 26, 1925
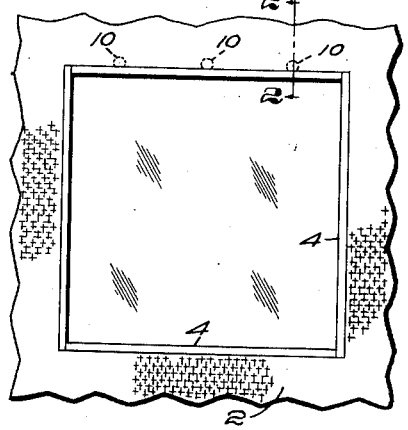
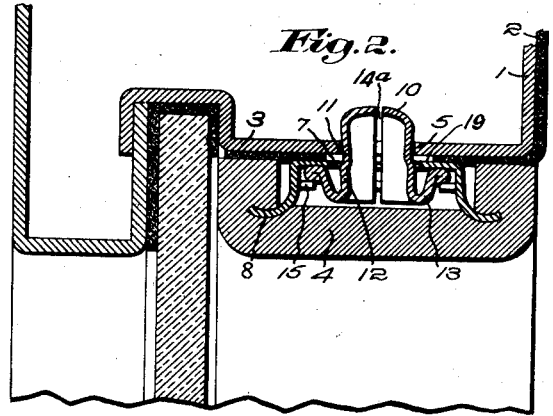
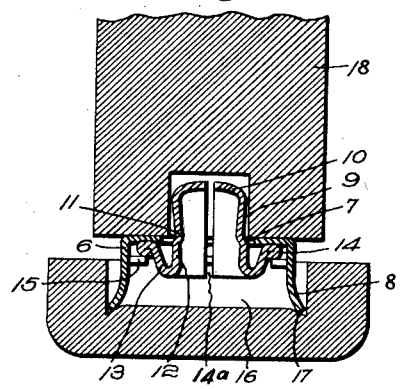
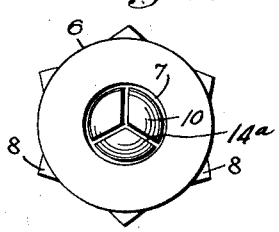
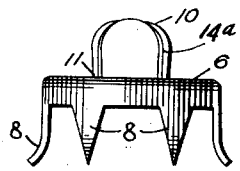
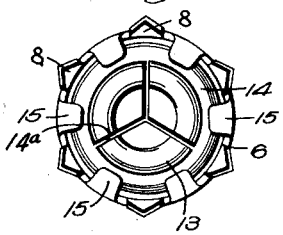
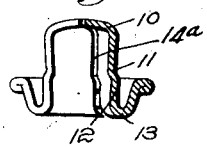
Inventor:
Fred S. Carr,
by Emery Booth Janney Varney
Attys.

Patented July 3, 1928.

1,675,787

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Original application filed February 26, 1925, Serial No. 11,695. Divided and this application filed August 25, 1925. Serial No. 52,317.

This invention aims to provide an improved fastener element particularly, though not exclusively, useful as a trim strip fastener element.

The application is a division of my prior application, Serial No. 11,695, filed February 26, 1925.

In the drawings, which illustrate a preferred embodiment of my invention:—

Figure 1 is an elevation view of a vehicle body window showing one of the uses of my invention;

Fig. 2 is a section on the line 2—2 of Fig. 1, showing the window casing, the trim strip and one of the fastening elements in cross-section;

Fig. 3 is a section of the trim strip showing one of the fastening elements being secured thereto;

Figs. 4, 5 and 6 include a plan, a side and a back view of the stud element of the separable fastening means; and Fig. 7 is a sectional view of the stud portion separate from the attaching portion.

Referring to the drawings, I have shown a novel method of securing trimming strips of wood, or other like relatively rigid strips, to a frame for providing a finished edge.

Heretofore window finishing strips, particularly in automobile body construction, and strips for other parts of the body have been secured thereto by means of nails, screws or the like which had their heads exposed at the outer surface of the trimming strip. This method of attachment is expensive and, moreover, it is inconvenient inasmuch as the nails or screws cannot be easily and quickly removed to permit access to underlying parts, such as to permit replacement of a broken window or to reupholster the inside of the car. Strips thus secured to the body become marked and scratched by the tools used to remove the nails or screws and are thereafter unsightly.

The specific embodiment of my invention illustrated provides a trimming installation including a trim strip which can be easily and quickly removed and replaced without in any way injuring its finish. Also no metal fastening parts, such as nails or screws, are exposed which may become rusted or marred.

Referring to Figs. 1 and 2, I have shown the window frame part of the body of a vehicle which includes the frame parts 1 forming the frame of the window, the upholstery fabric 2 at the inside of the body overlapping the edge 3 of the window frame and the finishing trim strips 4 concealing the overlapped edges of the upholstery fabric. These strips 4 are secured to the frame part 1 by a plurality of separable fastener elements, some of which are presented by the trim strips and their cooperating elements being presented by the frame part 1.

This type of trimming installation can be manufactured easily and inexpensively and a great saving is effected because of the speed with which the parts may be assembled. Also the trim strips 4 may be quickly removed for revarnishing, to permit change or washing of the upholstery or for access to any mechanical parts which may underlie the upholstery.

The fastening means, as illustrated, comprise a stud-receiving aperture 5 formed in the window frame part 1 and a stud, preferably shiftable relative to the aperture 5, secured to the trim strip as best illustrated in Fig. 2. The stud is formed of two parts, a casing 6 presenting an aperture 7 in the front face thereof, and a plurality of attaching prongs 8 for securing the casing to the wooden trim strip 4. The second part comprises a stud or socket-engaging part 9 having a head 10, a neck 11, a shank portion 12, an upwardly flared portion 13 surrounding the shank 12 and a reversely bent ringlike base portion 14 at the upper periphery of the upwardly flared portion, substantially in the same plane as the upper end of the shank portion 12. The head, neck, shank and upwardly flared portions of the stud part 9 are separated by a plurality of slits 14ª which permit expansion and contraction of the head to permit it to pass into the stud-receiving aperture 5.

The socket-engaging part 9 is held in the casing by a plurality of ears 15 bent inwardly from the edge of the casing between the prongs 8 and extending over the periphery of the base of the stud, as illustrated in Fig. 6. The head 10 and neck 11 of the stud pass through the aperture 7 in the casing for engagement in the stud-receiving aperture in the frame 1. I prefer to have the stud part 9 shiftable laterally relative to the casing 6 and therefore the aperture 7 in the casing is larger in diameter than the diameter of the head 10 or neck 11 of the stud and the casing 6 is larger in diameter than the base 14 of the stud.

To secure the stud element to the trim strip 4, I first provide a drilled hole or recess 16 in the strip, which extends only partly into the strip 4 and presents at the bottom of the recess, adjacent its periphery, an annular angular or anvil portion 17. Next the stud element is placed in the recess 16 so that the ends of the prongs 8, which are initially curvilinearly bent outwardly, are seated against the anvil portion 17, as illustrated in Fig. 3. Pressure is then exerted upon the front face of the casing by a suitable tool 18 (Fig. 3) until the tool seats against the inner face of the trim strip 4. This pressure causes the prongs to curve outwardly into the wood (Fig. 2) and provide a flush-type casing so that only the head 10 and neck 11 of the stud element extend beyond the inner face of the strip 4.

This method of attachment is neat because nothing is presented at the outer face of the trim strip and it is also very strong and durable because the prongs are spread out over and grip a relatively large area of the strip to provide a firm fastening means for the stud element.

Assembly of the installation is effected by stretching the upholstery fabric 2 over the frame 1 and securing it thereto, as by cementing the edges to that face of the frame that presents the stud-receiving apertures 5. Holes 19 (Fig. 2) are provided in the fabric to permit access to the stud-receiving apertures and the trim strips 4 are secured to frame by pressing the heads 11 of the studs into the stud-receiving apertures 5. The heads contract as they pass through the apertures and the sides of the heads are so shaped that they draw the trim strips 4 firmly against the upholstery fabric to provide a neat and finished appearance to the body of the vehicle. During engagement of the studs in the stud-receiving aperture 5, the stud parts 9 may shift laterally relative to the trim strips 4 to align with the apertures which may have been punched or drilled slightly out of alignment.

Separation of the fastener elements is effected by inserting a relatively thin-bladed instrument between the trim strip 4 and the fabric 2 and prying upwardly thereon to pull the studs out of engagement with the sockets.

While I have shown and described a preferred embodiment of my invention, it will be understood that changes involving omission, substitution, alteration and reversal of parts, and even changes in the mode of operation, may be made without departing from the scope of my invention, which is best defined in the following claims.

I claim:

1. A fastener stud installation comprising, in combination, a casing presenting a plurality of attaching prongs bent outwardly from the inner periphery of said casing into a rigid support, the outer face of said casing being flush with the support, and a laterally shiftable stud part held in said casing and having a head and a neck extending beyond the outer face of said casing.

2. A fastener stud including a casing part, a laterally shiftable socket-engaging stud part assembled with said casing part, a plurality of initially bent attaching prongs extending from said casing part for securing said casing part to a support and a plurality of ears extending inwardly from said casing part at points located between said attaching prongs thereby to hold the casing part and stud part in assembled relation.

3. A fastener stud element comprising a head, a neck, a shank and a base portion, said base portion flaring upwardly from said shank so that the outer peripheral portion of said base portion lies substantially in a plane with said neck, a plurality of intersecting slits extending through said head, neck, shank and upwardly flared portion to permit contraction and expansion of said head for engagement with a socket aperture of fixed dimensions and a reversely bent flange portion formed integral with said base portion at the periphery to prevent accidental splitting of said base portion adjacent the end of said slits during contraction and expansion of said stud element.

4. A fastener stud for trimming installations comprising, in combination, a casing part, a laterally shiftable socket-engaging part assembled with said casing part and having a head extending from said casing part at one side thereof and a plurality of outwardly bent attaching prongs presented at the opposite side of the casing part for securing said casing part to a suitable support, said socket-engaging part being shiftable laterally relative to said casing part to permit alignment with a cooperating socket.

5. A fastener stud for trimming installations comprising, in combination, a casing part, a laterally shiftable resilient socket-engaging part assembled with said casing part and having a head extending from said casing part at one side thereof and a plurality of outwardly bent attaching prongs presented at the opposite side of the casing part for securing said casing part to a suitable support, said socket-engaging part being shiftable laterally relative to said casing part to permit alignment with the cooperating socket.

In testimony whereof, I have signed my name to this specification.

FRED S. CARR.